United States Patent
Zhou et al.

(10) Patent No.: US 12,267,559 B2
(45) Date of Patent: Apr. 1, 2025

(54) LIVE STREAMING METHOD AND DEVICE

(71) Applicant: Beijing Bytedance Network Technology Co., Ltd., Beijing (CN)

(72) Inventors: Yingyue Zhou, Beijing (CN); Ke Zhong, Beijing (CN); Kun Chang, Beijing (CN); Qian Xue, Beijing (CN); Chen Zhang, Beijing (CN); Yineng Lu, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 36 days.

(21) Appl. No.: 18/299,407

(22) Filed: Apr. 12, 2023

(65) Prior Publication Data
US 2023/0247257 A1   Aug. 3, 2023

Related U.S. Application Data

(63) Continuation of application No. PCT/CN2021/119343, filed on Sep. 18, 2021.

(30) Foreign Application Priority Data

Oct. 12, 2020   (CN) .......................... 202011086351.0

(51) Int. Cl.
   *H04N 21/466* (2011.01)
   *H04N 21/2187* (2011.01)
(52) U.S. Cl.
   CPC ..... *H04N 21/4668* (2013.01); *H04N 21/2187* (2013.01)

(58) Field of Classification Search
   None
   See application file for complete search history.

(56) References Cited

U.S. PATENT DOCUMENTS

2016/0309234 A1   10/2016   Li et al.
2020/0007932 A1*   1/2020   Zavesky .......... H04N 21/44016

FOREIGN PATENT DOCUMENTS

CN   105916045 A   8/2016
CN   106027570 A   10/2016
(Continued)

OTHER PUBLICATIONS

China National Intellectual Property Administration, International Search Report and Written Opinion Issued in Application No. PCT/CN2021/119343, Dec. 16, 2021, WIPO, 15 pages.

(Continued)

*Primary Examiner* — Omar S Parra
(74) *Attorney, Agent, or Firm* — Alleman Hall & Tuttle LLP

(57) ABSTRACT

Embodiments of the present disclosure provide a live streaming and device, where the method includes: receiving push information of a target creation sent by a server, where the push information is sent by the server based on that the server determines that play popularity of the target creation meets preset popularity; and in response to an operation of a user on the push information, entering a first page of a live streaming application (App). In the embodiment of the present disclosure, by pushing the target creation whose play popularity exceeds preset popularity to the user, to prompt the user that one target creation is becoming a hot creation, so as to guide the user to go live with the target creation as a topic.

17 Claims, 8 Drawing Sheets

(56) References Cited

FOREIGN PATENT DOCUMENTS

| | | |
|---|---|---|
| CN | 106131706 A | 11/2016 |
| CN | 106604050 A | 4/2017 |
| CN | 107197321 A | 9/2017 |
| CN | 107247794 A | 10/2017 |
| CN | 108737892 A | 11/2018 |
| CN | 108737898 A | 11/2018 |
| CN | 109905723 A | 6/2019 |
| CN | 110198456 A | 9/2019 |
| CN | 110198483 A | 9/2019 |
| CN | 110446057 A | 11/2019 |
| CN | 110475132 A | 11/2019 |
| CN | 111064971 A | 4/2020 |
| CN | 111163076 A | 5/2020 |
| CN | 112235587 A | 1/2021 |
| WO | 2018039650 A1 | 3/2018 |

OTHER PUBLICATIONS

China National Intellectual Property Administration, Office Action Issued and Search Report in Application No. 202011086351.0, Mar. 8, 2022, 11 pages.

China National Intellectual Property Administration, Notice of Grant Issued in Application No. 202011086351.0, Oct. 10, 2022, 6 pages.

Nan, Z., "Why is social short video software popular," China Academic Journal Electronic Publishing House, Available Online at www.cnki.net, 2018, 3 pages. (Submitted with some English).

\* cited by examiner

LIVE STREAMING METHOD AND DEVICE

CROSS-REFERENCE TO RELATED APPLICATIONS

This application is a continuation of International Application No. PCT/CN2021/119343, filed on Sep. 18, 2021, which claims priority to Chinese Patent Application No. 202011086351.0, filed on Oct. 12, 2020, and entitled "Broadcasting Method and Device for Live Streaming". The disclosures of the aforementioned applications are hereby incorporated by reference in their entireties.

TECHNICAL FIELD

Embodiments of the present disclosure relate to the field of computer technology, and in particular, to a live streaming method and device.

BACKGROUND

With the development of Internet technology, especially the advent of mobile Internet era, various APPs of a mobile terminal have been developed. Therein, a live streaming App (Application) can provide users with rich Internet live streaming, which meets the entertainment needs of users.

SUMMARY

Embodiments of the present disclosure provide a live streaming method and a device, so that users in a live streaming App may go live according to guidance of push information of hot creations, which may improve live streaming experience of the user.

In a first aspect, an embodiment of the present disclosure provides a live streaming method, including:
  receiving push information of a target creation sent by a server, where the push information is sent by the server based on that the server determines that play popularity of the target creation meets preset popularity; and
  in response to an operation of a user on the push information, entering (displaying) a first page of a live streaming application (App), where the first page is used to go live.

In a second aspect, the embodiment of the present disclosure provides a live streaming method, including:
  acquiring submitted creations of a user in a first preset period; and
  based on that the server determines play popularity of any target creation among the submitted creations meets preset popularity, sending push information of the target creation to a client, so that the client may enter, in response to an operation of the user on the push information, a first page of a live streaming application (App).

In a third aspect, an embodiment of the present disclosure provides a live streaming device, including:
  a first module, configured to receive push information of a target creation sent by a server, where the push information is sent by the server based on that the server determines that play popularity of the target creation meets preset popularity; and
  a second module, configured to enter, in response to an operation of a user on the push information, a first page of a live streaming application (App).

In a fourth aspect, an embodiment of the present disclosure provides a server device, including:
  an acquisition module, configured to acquire submitted creations of a user in a first preset period; and
  a sending module, configured to send, based on that the server determines play popularity of any target creation among the submitted creations meets preset popularity, push information of the target creation to a client, so that the client may enter, in response to an operation of the user on the push information, a first page of a live streaming application (App).

In a fifth aspect, according to one or more embodiments of the present disclosure, there is provided an electronic device, including: a processor and a memory; where the memory stores computer executable instructions; and the processor executes the computer executable instructions stored in the memory, so that the processor executes the live streaming method according to various possible designs of the first aspect and the first aspect, or executes the live streaming method according to various possible designs of the second aspect and the second aspect.

In a sixth aspect, according to one or more embodiments of the present disclosure, there is provided a computer-readable storage medium, where the computer-readable storage medium stores thereon computer executable instructions which, when executed by a processor, implement the live streaming method according to various possible designs of the first aspect and the first aspect, or implement the live streaming method according to various possible designs of the second aspect and the second aspect.

In a seventh aspect, according to one or more embodiments of the present disclosure, there is provided a computer program product including a computer program carried in a computer-readable medium, where the computer program, when executed by a processor, executes the live streaming method according to various possible designs of the first aspect and the first aspect, or executes the live streaming method according to various possible designs of the second aspect and the second aspect.

In an eight aspect, according to one or more embodiments of the present disclosure, there is provided a computer program, where the computer program, when executed by a processor, executes the live streaming method according to various possible designs of the first aspect and the first aspect, or executes the live streaming method according to various possible designs of the second aspect and the second aspect.

The embodiments provide the live streaming method and device, in the method, by pushing the target creation whose play popularity exceeds preset popularity to the client, and prompting, at the client, the user that one target creation is becoming a hot creation, the user is guided to go live with the target creation as a topic, which may improve live streaming experience of the user.

BRIEF DESCRIPTION OF THE DRAWINGS

In order to more clearly illustrate the embodiments of the present disclosure or the technical solution in the prior art, the following will briefly introduce the drawings required in the description of the embodiments or the prior art. Apparently, the drawings described below are some embodiments of the present disclosure, for those of ordinary skill in the art, without creative effort, other drawings may also be obtained according to these drawings.

DESCRIPTION OF EMBODIMENTS

In order to make the purpose, technical solution and advantages of embodiments of the present disclosure clearer, the technical solution in the embodiment of the present disclosure will be clearly and completely described below with reference to the drawings. Apparently, the described embodiments are some of the embodiments of the present disclosure, but not all of them. Based on the embodiments of the present disclosure, all other embodiments obtained by those of ordinary skill in the art without creative effort belong to the scope of protection of the present disclosure.

Figure 1A:
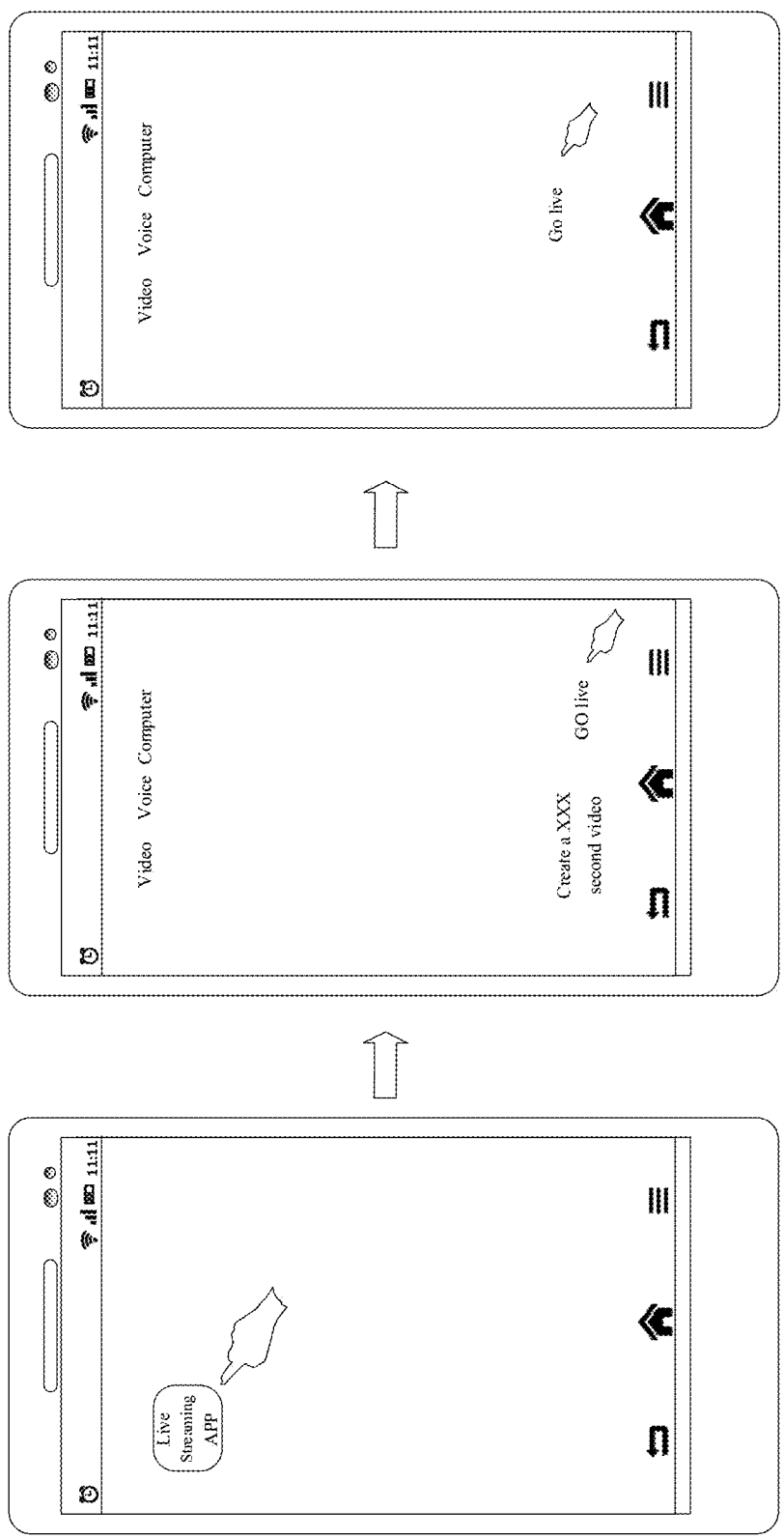
FIG. 1A is a schematic diagram of a scene of a live streaming provided by the prior art.

Referring to FIG. 1A, FIG. 1A is a schematic diagram of a broadcasting scene of a live streaming provided by the prior art. As shown in FIG. 1A, the live streaming method is as follows: a user opens a live streaming App and clicks a "Go live" button to enter a first page; and then, the user clicks a "Start a live streaming" button on the first page to enter the live streaming page. However, in this way, the user cannot go live on effective topics or themes.

To solve the above technical problem existing in the prior art, the embodiment of the present disclosure provides the following solutions: by pushing the target creation whose play popularity exceeds preset popularity to prompt the user that one target creation is becoming a hot creation, so as to guide the user to go live with the target creation as a topic, which may improve live streaming experience of the user.

Figure 1B:
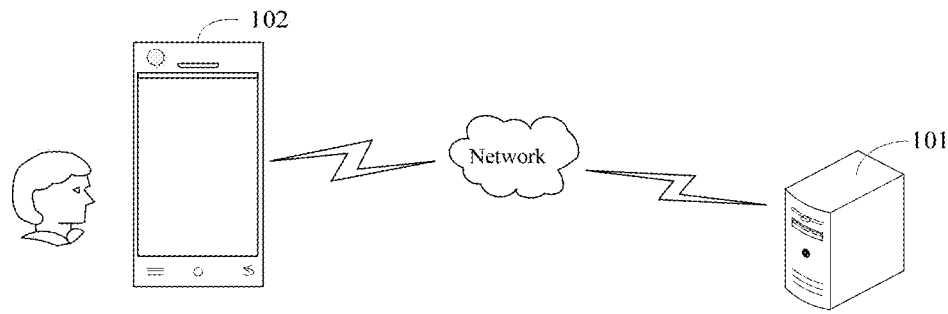
FIG. 1B is a system architecture diagram of a live streaming method provided by an embodiment of the present disclosure.

Referring to FIG. 1B, FIG. 1B is a system architecture diagram of a live streaming method provided by an embodiment of the present disclosure. Therein, a server 101 is configured to determine whether play popularity of a submitted creation meets preset popularity, and send a target creation to a client 102. The user enters the first page of the live streaming App by operating the push information on the client 102. The server 101 is connected with the client 102 through network communication. The server 101 according to the present disclosure may be a cluster including one server or multiple servers. The client 102 according to the present disclosure may be any terminal, which may be a wireless terminal or a wired terminal. The wireless terminal may be a device that provides voice and/or other business data connectivity to users, a handheld device with wireless connection function, or other processing devices connected to a wireless modem. The wireless terminal may communicate with one or more core network devices via a radio access network (RAN). The wireless terminal may be a mobile terminal, such as a mobile phone (also be called a "cellular" phone) and a computer with a mobile terminal, for example, the mobile terminal may be a portable, a pocket-sized, a handheld, a computer-built or an on-board mobile apparatus, which exchange language and/or data with the radio access network. For another example, the wireless terminal may also be a personal communication service (PCS) phone, a cordless phone, a session initiation protocol (SIP) phone, a wireless local loop (WLL) station, a personal digital assistant (PDA) and other devices. The wireless terminal may also be called a system, a subscriber unit, a subscriber station, a mobile station, a mobile, a remote station, a remote terminal, an access terminal, a user terminal, a user agent and a user device (User Equipment), which are not limited herein. In an implementation, the above terminal devices may also be smart watches, tablet computers and other devices. The interface is displayed by running the live streaming App installed on the terminal.

Figure 2:
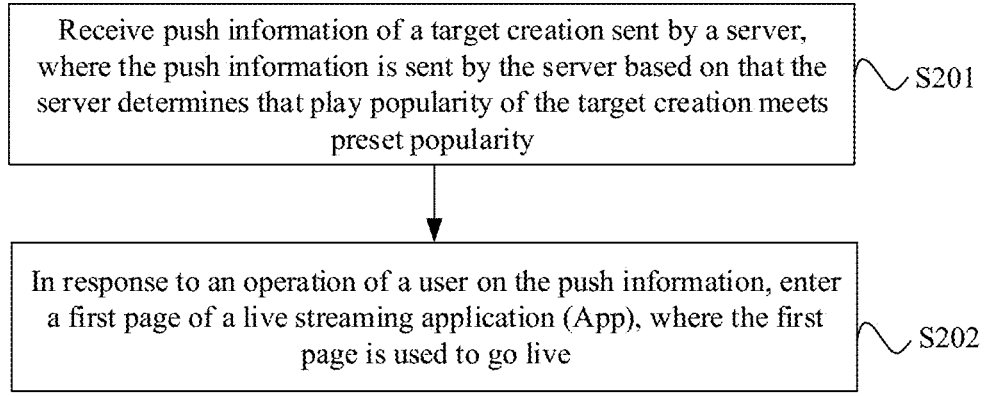
FIG. 2 is a flow chart I of a live streaming method provided by an embodiment of the present disclosure.

Referring to FIG. 2, FIG. 2 is a flow chart I of a live streaming method provided by an embodiment of the present disclosure. The live streaming method in the embodiment of the present disclosure may be applied to the client, and the live streaming method includes:

S201, receive push information of a target creation sent by a server, where the push information is sent by the server based on that the server determines that play popularity of the target creation meets preset popularity, where the push information may be a notification information and the target creation may be a target content.

In this embodiment, the target creation may be created by a user corresponding to the client, or be created by other users. This creation includes, but is not limited to, videos, voice or texts, etc.

In this embodiment, the determining that the play popularity of the target creation meets preset popularity may be that the number of times the target creation is played in the preset duration exceeds a threshold value.

S202, in response to an operation of a user on the push information, enter a first page of a live streaming application (App), the first page is used to go live.

In this embodiment, the operation of the user on the push information may be that the user clicks on the push information.

After entering the first page of the live streaming App, a start live streaming button is available on the first page. By clicking this button, a live streaming is started.

In this embodiment, the push information may be displayed in a push notification box.

According to the above embodiments, by pushing the target creation whose play popularity exceeds preset popularity to the client, and prompting, at the client, the user that one target creation is becoming a hot creation, the user is guided to go live with the target creation as a topic, which may improve live streaming experience of the user.

Figure 3:
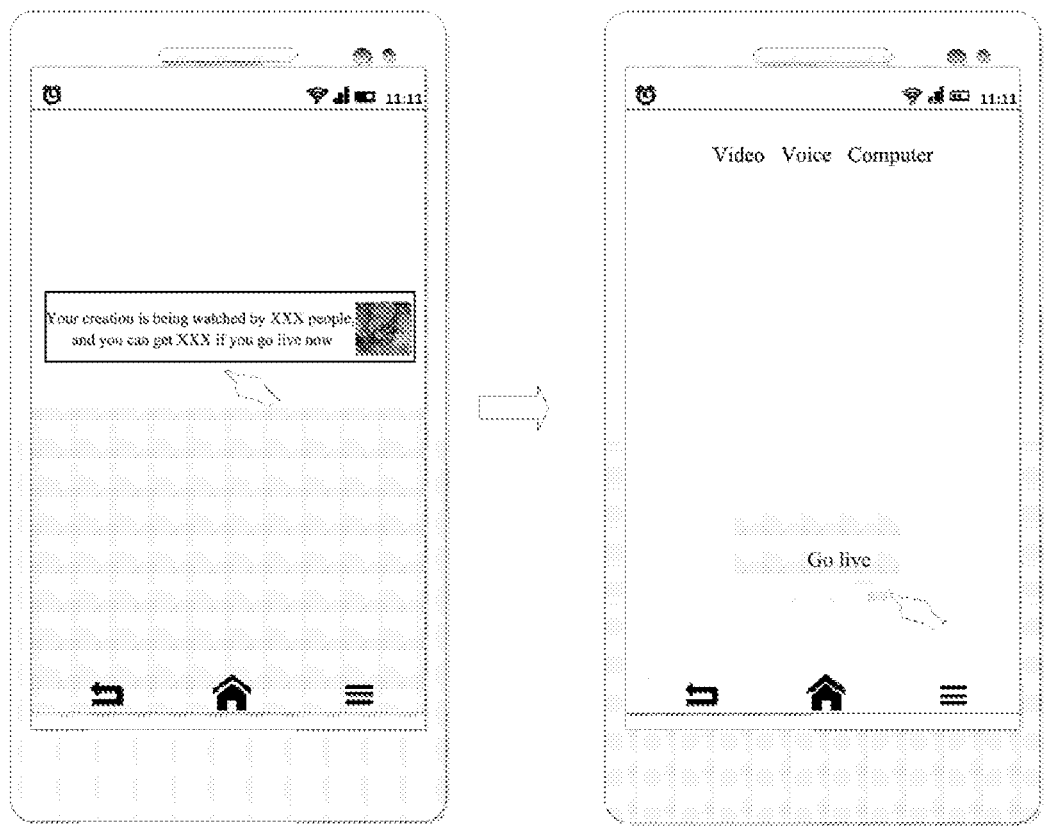
FIG. 3 is a scene diagram I of a live streaming method provided by an embodiment of the present disclosure.

Referring to FIG. 3, FIG. 3 is a scene diagram I of a live streaming method provided by an embodiment of the present disclosure. In this embodiment, in case the user at the client does not use the live streaming App, the live streaming method includes the following.

S301, receive the push information of the target creation sent by the server in a notification interface when the live streaming App is not used.

In this embodiment, the notification interface may be contained in the notification center of the client.

S302, in response to the operation of the user on the push information in the notification interface, enable the live streaming App and enter a first page of the live streaming APP.

In this embodiment, the operation of the user on the push information in the notification interface may refer to: the user clicks on the push information in the notification interface.

In this embodiment, the target creation may be a video creation, and the push information may contain a video cover and video copywriting.

In this embodiment, the push information may be displayed in the notification box, as shown in the left drawing of FIG. 3.

According to the above embodiments, when the live streaming App is not used, through the notification interface of the client, the push information of the target creation sent by the server and the operation of the user on the push information in the notification interface are received, the live streaming App is enabled and the first page of the live streaming APP is entered, allowing the user to quickly go live on the target creation, thereby improving the user experience.

Figure 4:
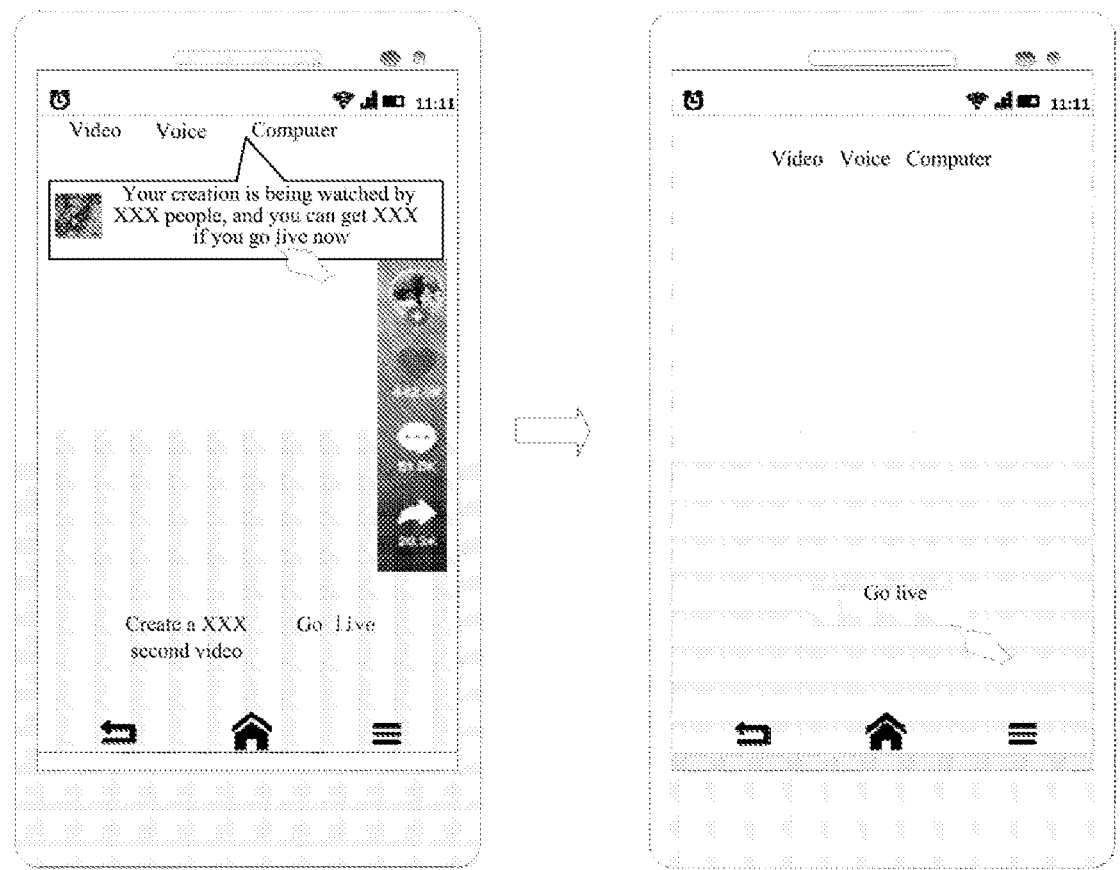
FIG. 4 is a scene diagram II of a live streaming method provided by an embodiment of the present disclosure.

Referring to FIG. 4, FIG. 4 is a scene diagram II of a live streaming method provided by an embodiment of the present disclosure. In this embodiment, when the user of the client uses the live streaming App, the live streaming method includes the following.

S401, receive the push information of the target creation sent by the server in an interface of the live streaming App when the live streaming App is used.

In this embodiment, the interface of the live streaming App may be a part of the interface of the live streaming App that does not affect the user experience, for example, other interfaces besides the live streaming page, a conversation page, a live streaming viewing page and a shooting page.

S402, in response to the operation of the user on the push information in the interface of the live streaming App, switch to the first page of the live streaming APP.

In this embodiment, the operation of the user on the push information in the interface of the live streaming App may refer to: the user clicks on the push information in the interface of the live streaming App.

In this embodiment, the push information may be displayed in a bubble pop-up box, as shown in the left drawing in FIG. 4.

In an embodiment of the present disclosure, when the live streaming App is used, the time interval for receiving the push information of the target creation sent by the server in the interface of the live streaming App may be set as required.

According to the above embodiments, in case of using the live streaming App at the client by the user, by receiving the push information of the target creation sent by the server through the interface of the live streaming App, the user may directly switch to the first page of the live streaming App as required during the process of using the live streaming APP, thus improving the live streaming experience of the user.

In an embodiment of the present disclosure, the first page of the live streaming application (App) displays the topic of the target creation in association. Specifically, the topic of the target creation is acquired; and the topic of the target creation is displayed on the first page of the live streaming App. For example, in case that the target creation is a video, and its topic is "XXX Challenge", the first page of the live streaming application (App) is directly related to the topic "XXX Challenge". By automatically associating the topic through the first page, the user may always pay attention to the topic during his live streaming, and it is also convenient for other users to search for hot topics and enter corresponding live studio.

In an embodiment of the present disclosure, in S202 of the above embodiment, the process of receiving the push information of the target creation sent by the server in the interface of the live streaming App may include:

S2021, receive the push information of the target creation in the interface of the live streaming App, if the interface of the live streaming App is a target interface.

S2022, not receive the push information of the target creation in the interface of the live streaming App, if the interface of the live streaming App is not the target interface; where the target interface is the other interface besides the live streaming page, the conversation page, the live streaming viewing page and the shooting page.

In this embodiment, the target interface does not include the live streaming page, the conversation page, the live streaming viewing page and the shooting page. As an interface that does not affect the user experience, the push information is displayed only at the interface that does not affect the user experience, so that the user experience using the live streaming App is improved.

Figure 5:
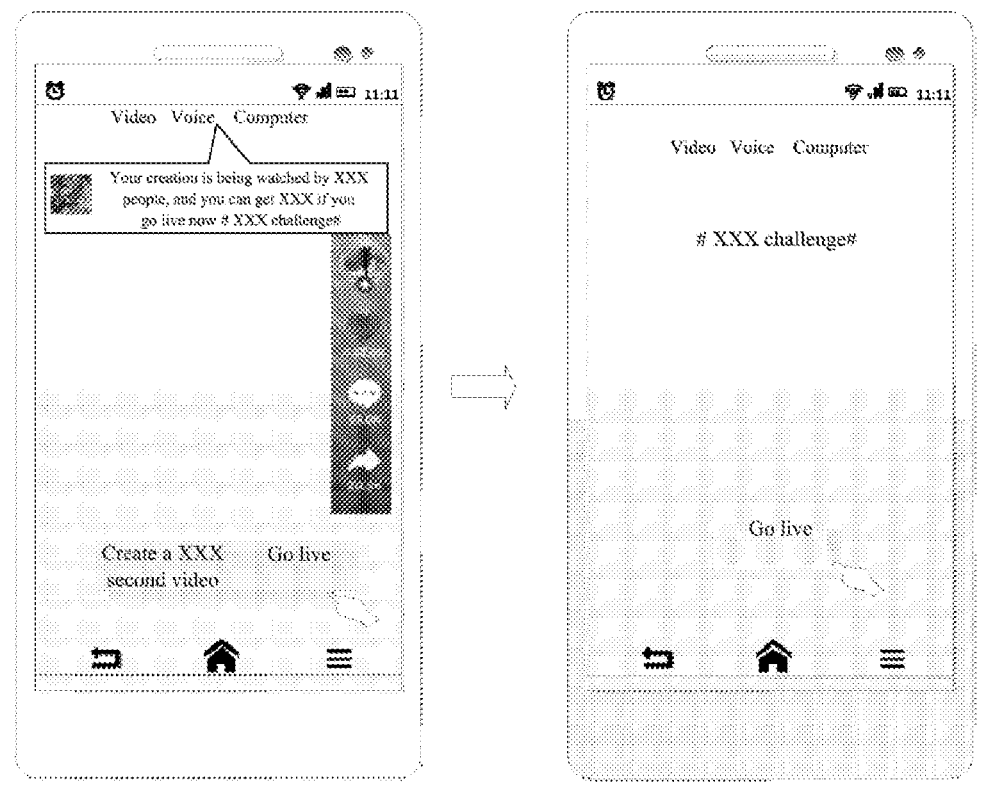
FIG. 5 is a scene diagram III of a live streaming method provided by an embodiment of the present disclosure.

Referring to FIG. 5, FIG. 5 is a scene diagram III of a live streaming method provided by an embodiment of the present disclosure. In an embodiment of the present disclosure, after receiving the push information of the target creation sent by the server, the following is further included.

S203, in a preset period, in response to an operation of the user on a control, for going live, of the live streaming App, enter the first page of the live streaming App, where the first page displays the topic of the target creation in association.

In this embodiment, the preset period may be set as required. The control, for going live, of the live streaming App may be the button to start live streaming in the live streaming App. When going live within the preset period after receiving the push information of the target creation, the first page may automatically associate with the topic of the target creation (as shown in FIG. 5, #XXX Challenge #), that is, it is default that the user goes live for the topic for the push information of the target creation, which omits the step of operation on the push information by users and makes the operation easier.

Figure 6:
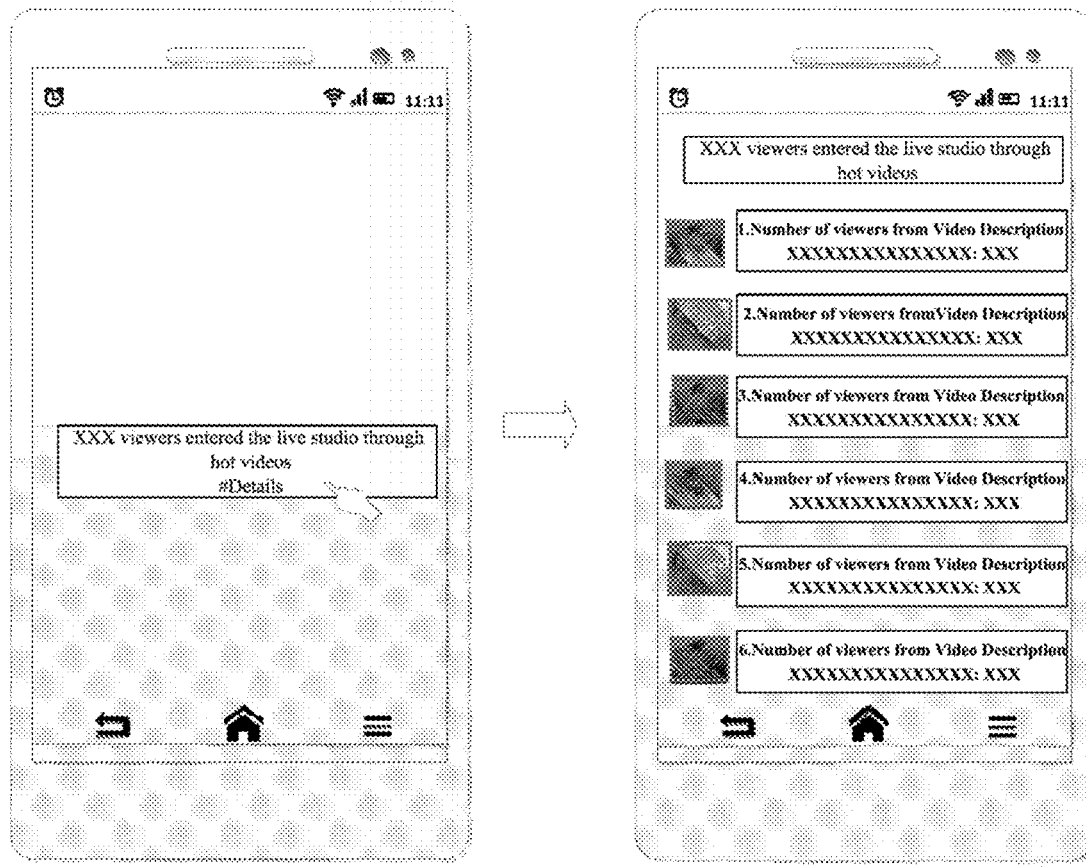
FIG. 6 is a scene diagram IV of a live streaming method provided by an embodiment of the present disclosure.

Referring to FIG. 6, FIG. 6 is a scene diagram IV of a live streaming method provided by an embodiment of the present disclosure. In an embodiment of the present disclosure, the live streaming method further includes the following.

S204, when the live streaming is finished, in respond to an operation of the user on a preset touch and reach bar on a second page of the live streaming App, enter a third page; where the third page displays varieties of creation information sorted according to live streaming viewers of creations, where the second page is used to live end, and the third page is diversion and aggregation page of the creation.

In this embodiment, the preset touch and reach bar may be set at any position of the second page of the live streaming App.

Further referring to FIG. 6, in case the creation is a video, the preset touch and reach bar may display the copywriting of "XXX viewers entered the live studio through hot videos".

The copywriting of "XXX viewers entered the live studio through hot videos" and a list of hot videos may be displayed on the third page.

Details of the hot videos may include following information: a video cover, a video description, duration, release time, a number of times of playback and a number of times of live streaming viewers.

Figure 7:
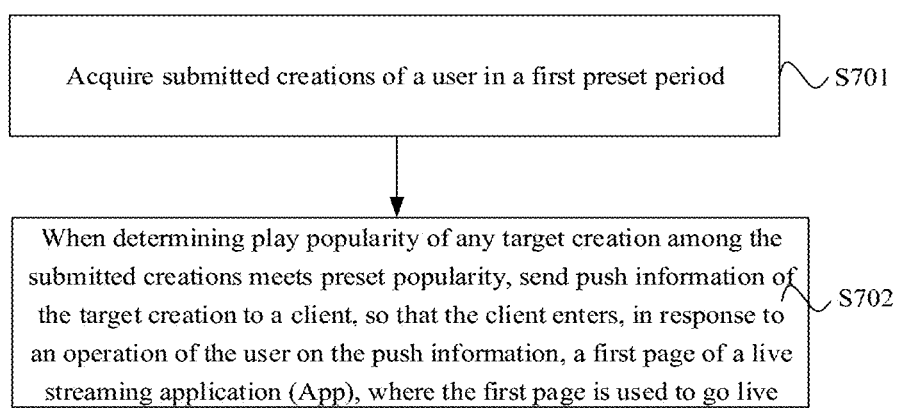
FIG. 7 is a flow chart II of a live streaming method provided by an embodiment of the present disclosure.

Referring to FIG. 7, FIG. 7 is a flow chart II of a live streaming method provided by an embodiment of the present disclosure. The live streaming method in the embodiment of the present disclosure may be applied to the server, and the live streaming method includes the following.

S701, acquire submitted creations of a user in a first preset period.

In this embodiment, the first preset period may be set as required, for example, the submitted creations of the first preset period are the submitted creations within seven days before the current day. If no submitted creation is in the first preset period, the process is directly ended.

S702, based on that the server determines play popularity of any target creation among the submitted creations meets preset popularity, send push information of the target creation to a client, so that the client enters, in response to an operation of the user on the push information, a first page of a live streaming application (App).

According to the above embodiments, by pushing the target creation whose play popularity exceeds preset popularity to the client, and prompting, at the client, the user that one target creation is becoming a hot creation, the user is guided to go live with the target creation as a topic, which may improve live streaming experience of the user.

In an embodiment of the present disclosure, specifically, in S702, the determining the play popularity of any target creation among the submitted creations meet the preset popularity includes:

S7011, acquire a number of times of playback of the submitted creations of the user in a first preset period; and S7012, if the number of times of playback of any target creation among the submitted creations in a preset playback period exceeds a first threshold value, determine that the play popularity of the target creation meets preset popularity.

In this embodiment, the process of determining the first threshold value is as follows: acquiring the number of times of playback of the submitted creations of the user in a second preset period; and according to a total number of times of playback of all the submitted creations in the second preset period, the number of submitted creations in the second preset period, and a set proportion threshold, calculating the first threshold value.

The threshold value is acquired by dividing the total number of times of playback of all the submitted creations in the second preset period by the number of the submitted creations in the second preset period, and then by multiplying by the set proportion threshold.

The set proportion threshold may be 10%, 25% or 50%.

In an embodiment of the present disclosure, after acquiring the number of times of playback of the submitted creations of the user in the first preset period, the method further includes the following.

S7013, judge whether the number of times of playback of the submitted creation, in the second preset period, exceeds the second threshold value.

In this embodiment, the second threshold value may be set as required, for example.

S7014, if it exceeds the second threshold value and the user meets a condition for going live, judge whether the number of times of playback of any target creation among the submitted creations in the preset playback period exceeds the first threshold value.

In this embodiment, the condition, for going live, that the user meets include: the user belongs to a target user, and the user did not go live on the same day. The target users include users who have gone live or users who have watched live.

In an embodiment of the present disclosure, the sending the push information of the target creation to the client in S702 includes the following.

S7021, determine a user type corresponding to the target creation.

In this embodiment, the user types include: a type of going live and a type of not going live.

S7022, determine a push period of the push information corresponding to the user type.

S7023, if the push information is not received, within the push period, by a user corresponding to the target creation, send the push information of the target creation to the client corresponding to the user.

In this embodiment, if the push information has been pushed in one push period, it is no longer pushed.

As can be seen from the above embodiments, according to the user type, the push period is determined, the push information is sent according to the push period, and the frequency of sending push information for users is controlled.

In an embodiment of the present disclosure, S7023 further introduces two different ways of sending the push information of the target creation to the client corresponding to the user, including:

S70231, if determining that the live streaming App is used, immediately send the push information of the target creation to the client corresponding to the user; and S70232, if determining that the live streaming App is not used, send, within a set time window, the push information of the target creation to the client corresponding to the user.

The set time window is the time of the user using the client.

Figure 8:
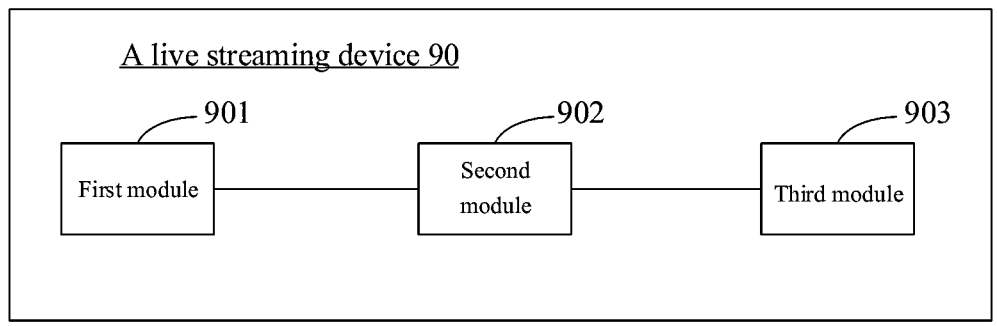
FIG. 8 is a structure block diagram of a live streaming device provided by an embodiment of the present disclosure.

Referring to FIG. 8, FIG. 8 is a structure block diagram of a live streaming device provided by an embodiment of the present disclosure. For ease of explanation, only the parts related to the embodiments of the present disclosure are shown. Referring to FIG. 8, the live streaming device 90 includes a first module 901 and a second module 902.

The first module 901 is configured to receive push information of a target creation sent by a server, where the push information is sent by the server based on that the server determines that play popularity of the target creation meets preset popularity.

The second module 902 is configured to enter, in response to an operation of a user on the push information, a first page of a live streaming application (App).

The device provided by the embodiment of the present disclosure may be used to execute the technical solution of the above method embodiment, and the implementation principles and technical effects thereof are similar, which will not be repeated in this embodiment.

In an embodiment of the present disclosure, the first module 901 is specifically configured to receive the push information of the target creation sent by the server in a notification interface when the live streaming App is not used; and the second module 902 is specifically configured to, in response to the operation of the user on the push information in the notification interface, enable the live streaming App and enter a first page of the live streaming APP.

In an embodiment of the present disclosure, the first module 901 is specifically configured to receive the push information of the target creation sent by the server in an interface of the live streaming App when the live streaming App is used; and the second module 902 is specifically configured to, in response to the operation of the user on the push information in the interface of the live streaming App, switch to the first page of the live streaming APP.

In an embodiment of the present disclosure, the first module 901 is further specifically configured to receive the push information of the target creation in the interface of the live streaming App, if the interface of the live streaming App is not a target interface; and not receive the push information of the target creation in the interface of the live streaming App, if the interface of the live streaming App is the target interface; where the target interface includes one of the live streaming page, the conversation page, the live streaming viewing page and the shooting page.

In an embodiment of the present disclosure, the second module 902 is further specifically configured to, in a preset period, in response to an operation of the user on a control, for going live, of the live streaming App, enter the first page of the live streaming App, where the first page displays the topic of the target creation in association.

In an embodiment of the present disclosure, the streaming device 90 further includes: a third module 903, configured to, when the live streaming is finished, in respond to an operation of the user on a preset touch and reach bar on a second page of the live streaming App, enter a third page; where the third page displays varieties of creation information sorted according to live streaming viewers of creations.

Figure 9:
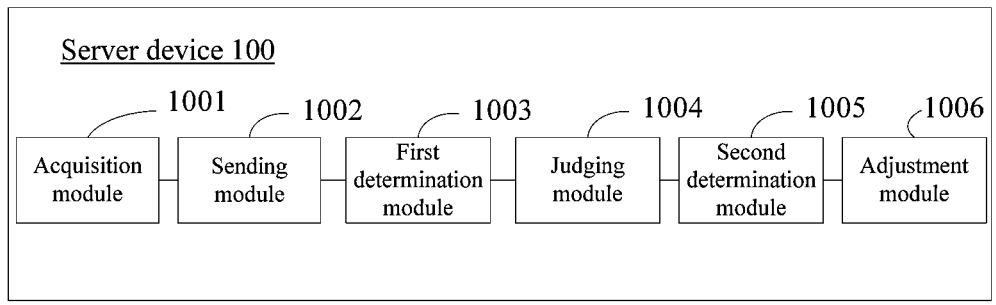
FIG. 9 is a structure block diagram of a server device provided by an embodiment of the present disclosure.

Referring to FIG. 9, FIG. 9 is a structure block diagram of a server device provided by an embodiment of the present disclosure. For ease of explanation, only the parts related to the embodiments of the present disclosure are shown. Referring to FIG. 9, the server device 100 includes an acquisition module 1001 and a sending module 1002.

The acquisition module 1001 is configured to acquire submitted creations of a user in a first preset period.

The sending module 1002 is configured to send, based on that the server determines play popularity of any target creation among the submitted creations meets preset popularity, push information of the target creation to a client, so that the client enters, in response to an operation of the user on the push information, a first page of a live streaming application (App).

The device provided by the embodiment of the present disclosure may be used to execute the technical solution of the above method embodiment, and the implementation principles and technical effects thereof are similar, which will not be repeated in this embodiment.

In an embodiment of the present disclosure, the server device 100 further includes a first determination module 1003, configured to acquire a number of times of playback of the submitted creations of the user in a first preset period; and if the number of times of playback of any target creation among the submitted creations in a preset playback period exceeds a first threshold value, determine that the play popularity of the target creation meets preset popularity.

In an embodiment of the present disclosure, the server device 100 further includes a judging module 1004, configured to judge whether the number of times of playback of the submitted creation, in the second preset period, exceeds the second threshold value; and if it exceeds the second threshold value and the user meets the condition for going live, judge whether the number of times of playback of any target creation among the submitted creations in the preset playback period exceeds the first threshold value.

In an embodiment of the present disclosure, the server device 100 further includes a second determination module 1005, configured to acquire the number of time of playback of the submitted creations of the users in a second preset period; and according to a total number of times of playback of all the submitted creations in the second preset period, the number of submitted creations in the second preset period, and a set proportion threshold, calculate the first threshold value.

In an embodiment of the present disclosure, the sending module 1002 is further configured to: determine a user type of a user corresponding to the target creation; determine a push period of the push information corresponding to the user type of the user; and if the push information is not received, within the push period, by a user corresponding to the target creation, send the push information of the target creation to the client corresponding to the user.

In an embodiment of the present disclosure, the sending module 1002 is further configured to: if determining that the live streaming App is used, immediately send the push information of the target creation to the client corresponding to the user; and if determining that the live streaming App is not used, send, within a set time window, the push information of the target creation to the client corresponding to the user.

In an embodiment of the present disclosure, the device further includes an adjustment module 1006, configured to determine the number of times of the push information pushed to the client corresponding to the user; and adjust a weight of the push period corresponding to the user according to the number of times of the push information.

In order to implement the above embodiments, the embodiments of the present disclosure further provide an electronic device.

Figure 10:
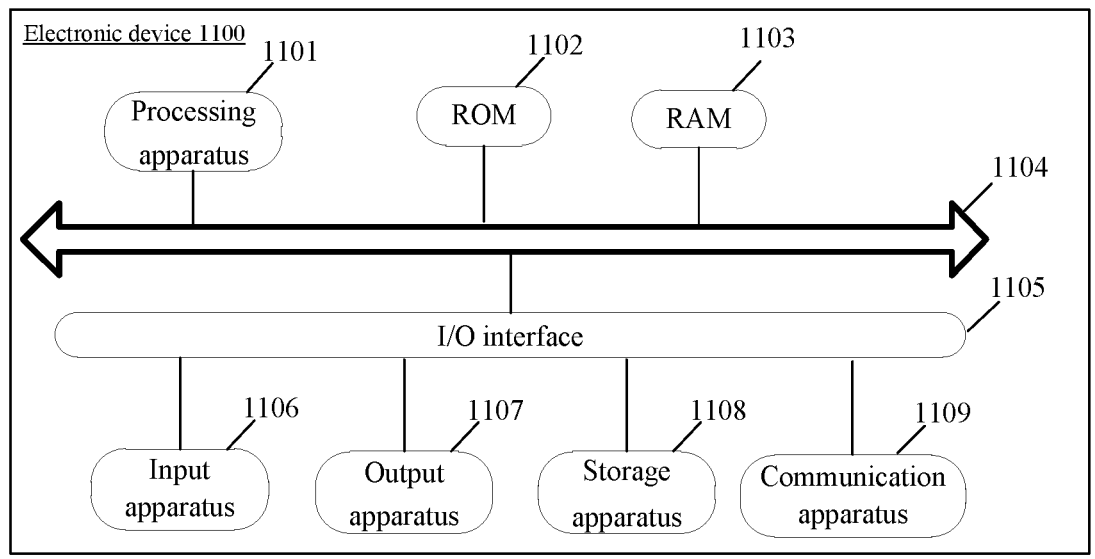
FIG. 10 is a schematic structural diagram of an electronic device provided by an embodiment of the present disclosure.

Referring to FIG. 10, it shows a schematic structural diagram of an electronic device 1100 applicable to implement the embodiment of the present disclosure. The electronic device 1100 may be a terminal device or a server. Where the terminal device may include, but is not limited to, mobile terminals such as a mobile phone, a notebook computer, a digital broadcast receiver, a personal digital assistant (PDA), a portable android device (PAD), a portable multimedia player (PMP), an on-board terminal (for example, an on-board navigation terminal) and fixed terminals such as a digital TV and a desktop computer. The electronic device shown in FIG. 10 is only an example, and should not impose any limitation on the function and scope of use of the embodiment of the present disclosure.

As shown in FIG. 10, the electronic device 1100 may include a processing apparatus (such as a central processor and a graphics processor) 1101, which may perform various appropriate actions and processes according to a program stored in a read only memory (ROM) 1102 or a program loaded from a storage apparatus 1108 into a random access memory (RAM) 1103. The RAM 1103 also stores various programs and data required for the operation of the electronic device 1100. The processing apparatus 1101, the ROM 1102, and the RAM 1103 are connected to each other through a bus 1104. An input/output (I/O) interface 1105 is also connected to the bus 1104.

Generally, the following apparatuses may be connected to the I/O interface 1105: an input apparatus 1106 including, such as a touch screen, a touch panel, a keyboard, a mouse, a camera, a microphone, an accelerometer, a gyroscope; an output apparatus 1107 including, such as a liquid crystal display (LCD), a speaker, a vibrator; a storage apparatus 1108 including, such as a magnetic tape and a hard disk; and a communication apparatus 1109. The communication apparatus 1109 may allow the electronic device 1100 to perform wireless or wired communication with other devices to exchange data. Although FIG. 10 shows the electronic device 1100 with various apparatuses, it should be understood that it is not required to implement nor have all the apparatuses shown. More or fewer apparatuses may alternatively be implemented or provided.

Particularly, according to the embodiment of the present disclosure, the process described above with reference to the flowchart may be implemented as a computer software program. For example, the embodiment of the present disclosure includes a computer program product, which includes a computer program carried on a computer readable medium, and the computer program contains the program code for executing the method shown in the flowchart. In such an embodiment, the computer program may be downloaded and installed from the network through the communication apparatus 1109, or installed from the storage apparatus 1108 or from the ROM 1102. When the computer program is executed by the processing apparatus 1101, the above functions defined by the method according to the embodiment of the present disclosure are executed.

It should be noted that the above computer-readable medium of the present disclosure may be a computer-readable signal medium or a computer-readable storage medium, or a combination of the above two. The computer-readable storage medium may be, for example, but not limited to, electrical, magnetic, optical, electromagnetic, infrared, or semiconductor systems, apparatus, or devices, or a combination of any of the above. More specific examples of the computer-readable storage medium may include, but are not limited to, an electrical connection with one or more wires, a portable computer diskette, a hard disk, a random access memory (RAM), a read only memory (ROM), an erasable programmable read only memory (EPROM or flash memory), optical fiber, a portable compact disk read only memory (CD-ROM), an optical storage device, a magnetic storage device, or any suitable combination of the above. In the present disclosure, the computer-readable storage medium may be any tangible medium that contains or stores a program that may be used by, or may be used in combination with, an instruction execution system, apparatus, or device. In the present disclosure, however, the computer-readable signal medium may include data signals propagated in baseband or as part of a carrier wave, and computer readable program codes are carried in the data signals. The data signal propagated in such a way may take various forms, including but not limited to an electromagnetic signal, an optical signal or any suitable combination of the above. The computer-readable signal medium may also be any computer-readable medium other than the computer-readable storage medium, which may transmit, propagate or transport a program that may be used by, or be used in combination with, the instruction execution system, apparatus, or device. The program code contained in the computer readable medium may be transmitted by any suitable medium, including but not limited to an electric wire, an optical cable, the RF (radio frequency), etc., or any suitable combination of the above.

The above computer readable medium may be contained in the above electronic device; or it may exist separately without being assembled into the electronic device.

The above computer readable medium carries one or more programs which, when executed by the electronic device, cause the electronic device to execute the methods according to the above embodiments.

Program codes used to execute the operations of the present disclosure may be written in one or more programming languages or their combinations, where the program codes include object-oriented programming languages such as Java, Smalltalk, C++, and conventional procedural programming languages such as the "C" language or similar programming languages. The program codes may be executed wholly or partly on a user computer, be executed as an independent software package, be executed partly on the user computer and partly on a remote computer, or be executed wholly on the remote computer or the server. In the case of a remote computer, the remote computer may be connected to the user computer through any kind of network, including the local area network (LAN) or the wide area network (WAN), or it may be connected to an external computer (for example, using an Internet service provider to connect through the Internet).

The flowchart and block diagram in the accompanying drawings illustrate possible architectures, functions, and operations of a system, a method, and a computer program product according to the embodiments of the present disclosure. In this regard, each box in the flowchart or the block diagram may represent a module, a program segment, or part of a code, which contain one or more executable instructions for implementing the specified logical function. It should also be noted that, in some alternative implementations, the functions marked in the box may also occur in a different order than those marked in the drawings. For example, two consecutive boxes may actually be executed in parallel, basically, and sometimes they may be executed in a reverse order, depending on the functions involved. It should also be noted that each box in the block diagram and/or the flowchart, and the combination of boxes in the block diagram and/or the flowchart, may be implemented by a dedicated hardware-based system that performs specified functions or operations, or may be implemented by a combination of dedicated hardware and computer instructions.

The units involved in the embodiments described in the present disclosure may be implemented by software or hardware. A name of a unit does not constitute a limitation on the unit itself in some cases. For example, the first acquisition unit can also be described as "a unit for acquiring at least two Internet protocol addresses".

The functions described above herein may be performed at least in part by one or more hardware logic components. For example, without limitation, exemplary types of hardware logic components that may be used include: a field programmable gate array (FPGA), an application specific integrated circuit (ASIC), an application specific standard product (ASSP), a system-on-chip (SOC), a complex programmable logic device (CPLD), etc.

In the context of the present disclosure, a machine-readable medium may be a tangible medium, which may contain or store a program for use by the instruction execution system, apparatus, or device, or for use in connection with the instruction execution system, apparatus, or device. The machine-readable medium may be a machine-readable signal medium or a machine-readable storage medium. The machine-readable medium may include, but not limited to the system, apparatus, or device in the following forms: electronic, magnetic, optical, electromagnetic, infrared, or semiconductor, or may include any suitable combination of the above. More specific examples of machine-readable storage medium may include the electrical connection based on one or more wires, a portable computer disk, the hard disk, the random access memory (RAM), the read-only memory (ROM), the erasable programmable read only memory (EPROM or flash memory), the optical fiber, the portable compact disk read-only memory (CD-ROM), the optical storage device, the magnetic storage device, or any suitable combination of the above.

An embodiment of the present disclosure further provides a computer program which, when executed by a processor, executes the live streaming method provided by any one of the above embodiments.

The above description is merely the preferred embodiment of the present disclosure and an illustration of the technical principles used. Those skilled in the art should understand that the disclosure scope involved in the present disclosure is not limited to the technical solutions formed by the specific combination of the above technical features; at the same time, it should also cover, without departing from the above disclosed concept, other technical solutions formed by any combination of the above technical features or their equivalents, for example, the technical solution that is formed by replacing the above features with the technical features (but not limited to) having similar functions that are disclosed in the present disclosure.

In addition, although operations are illustrated in a particular order, this should not be understood, however, as requiring the operations to be performed in the particular order shown or in a sequential order. Under certain circumstances, multitasking and parallel processing may be beneficial. Likewise, although the above discussion contains several specific implementation details, these should not be construed as limitations on the scope of the present disclosure. Some features described in the context of separate embodiments may also be implemented in combination in a single embodiment. Conversely, the features described in the context of a single embodiment may also be implemented in multiple embodiments separately or in any appropriate subcombination.

Although the subject has been described in a language specific to structural features and/or logical actions of the method, it should be understood, however, that the subject defined in the appended claims is not necessarily limited to the specific features or actions described above. On the contrary, the specific features and actions described above are merely example forms for implementing the claims.

What is claimed is:

1. A live streaming method, comprising:
receiving notification information of a target content sent by a server, wherein the notification information is sent by the server based on that the server determines that play popularity of the target content meets preset popularity; and
in response to an operation of a user on the notification information, entering a first page of a live streaming application (App), wherein the first page is used to go live;
wherein the receiving the notification information of the target content sent by the server comprises:
receiving the notification information of the target content sent by the server in a notification interface when the live streaming App is not used; and
in response to the operation of the user on the notification information, displaying the first page comprises:
in response to the operation of the user on the notification information in the notification interface, enabling the live streaming App and displaying the first page of the live streaming App.

2. The method according to claim 1, wherein the receiving the notification information of the target content sent by the server comprises:
receiving the notification information of the target content sent by the server in an interface of the live streaming App when the live streaming App is used; and
in response to the operation of the user on the notification information, displaying the first page of the live broadcast comprises:
in response to the operation of the user on the notification information in the interface of the live streaming App, switching to the first page of the live streaming App.

3. The method according to claim 2, wherein the receiving the notification information of the target content sent by the server in the interface of the live streaming App when the live streaming App is used comprises:
receiving the notification information of the target content in the interface of the live streaming App, if the interface of the live streaming App is a target interface.

4. The method according to claim 1, further comprising:
acquiring a topic of the target content; and
displaying the topic of the target content on the first page of the live streaming App.

5. The method according to claim 4, after receiving the notification information of the target content sent by the server, further comprising:
in a preset period, in response to an operation of the user on a control, for going live, of the live streaming App, displaying the first page of the live streaming App, wherein the first page displays the topic of the target content in association.

6. The method according to claim 1, further comprising:
when the live streaming is finished, in respond to an operation of the user on a preset touch and reach bar on a second page of the live streaming App, displaying a third page; wherein the third page displays varieties of creation information sorted according to live streaming viewers of creations, the second page is used to live end, and the third page is diversion and aggregation page of the creation.

7. The method according to claim 1, wherein a display mode of the notification information is through a push notification box or a bubble pop-up box.

8. A live streaming method, comprising:
acquiring submitted creations of a user in a first preset period; and
when determining play popularity of any target content among the submitted creations meets preset popularity, sending notification information of the target content to a client, so that the client displays, in response to an operation of the user on the notification information, a first page of a live streaming application (App), wherein the first page is used to go live;
wherein the determining the play popularity of any target content among the submitted creations meet the preset popularity comprises:
acquiring a number of times of playback of the submitted creations of the user in the first preset period; and
if the number of times of playback of any target content among the submitted creations in a preset playback period exceeds a first threshold value, determining that the play popularity of the target content meets preset popularity;

wherein before acquiring the number of times of playback of the submitted creations of the user in the first preset period, further comprising:

acquiring the number of times of playback of the submitted creations of the user in a second preset period; and according to a total number of times of playback of all the submitted creations in the second preset period, the number of submitted creations in the second preset period, and a set proportion threshold, calculating the first threshold value.

9. The method according to claim 8, after acquiring the number of times of playback of the submitted creations of the user in the first preset period, further comprising:

judging whether the number of times of playback of the submitted creations, in the first preset period, exceeds a second threshold value; and if the number of times of playback of the submitted creations, in the first preset period, exceeds the second threshold value and the user meets a condition for going live, judging whether the number of times of playback of any target content among the submitted creations in the preset playback period exceeds the first threshold value.

10. The method according to claim 8, wherein according to the total number of times of playback of all the submitted creations in the second preset period, the number of submitted creations in the second preset period, and the set proportion threshold, calculating the first threshold value comprises:

acquiring the first threshold value, by dividing the total number of times of playback of all the submitted creations in the second preset period by the number of the submitted creations in the second preset period, and then multiplying by the set proportion threshold.

11. The method according to claim 8, wherein the sending of the notification information of the target content to the client comprises:

determining a user type of a user corresponding to the target content;

determining a push period of the notification information corresponding to the user type of the user; and if the notification information is not received, within the push period, by the user corresponding to the target content, sending the notification information of the target content to the client corresponding to the user.

12. The method according to claim 11, further comprising:

determining the number of times of the notification information pushed to the client corresponding to the user; and adjusting a weight of the push period corresponding to the user according to the number of times of the notification information.

13. The method according to claim 8, wherein the sending the notification information of the target content to the client comprises:

if determining that the client is using the live streaming App, immediately sending the notification information of the target content to the client; and if determining that the client does not use the live streaming App, sending, within a set time window, the notification information of the target content to the client.

14. A live streaming device, comprising:

a processor;

a communication interface connected with the processor; and a memory storing instructions and connected with the processor; wherein, the instructions, when executed by the processor, cause the processor to:

receive, through the communication interface, notification information of a target content sent by a server, wherein the notification information is sent by the server based on that the server determines that play popularity of the target content meets preset popularity; and display, in response to an operation of a user on the notification information, a first page of a live streaming application (App), wherein the first page is used to go live;

wherein the processor is further caused to:

receive the notification information of the target content sent by the server in a notification interface when the live streaming App is not used; and in response to the operation of the user on the notification information in the notification interface, enable the live streaming App and display the first page of the live streaming App.

15. A server device, comprising: a processor and a memory;

wherein the memory stores computer executable instructions; and the processor executes the computer executable instructions stored in the memory, so that the processor executes the live streaming method according to claim 8.

16. A non-transitory computer-readable storage medium, wherein the computer-readable storage medium stores thereon computer executable instructions which, when executed by a processor, implement the live streaming method according to claim 1.

17. A non-transitory computer-readable storage medium, wherein the computer-readable storage medium stores thereon computer executable instructions which, when executed by a processor, implement the live streaming method according to claim 8.

* * * * *